US008477380B2

(12) United States Patent
Telem et al.

(10) Patent No.: US 8,477,380 B2
(45) Date of Patent: Jul. 2, 2013

(54) OPTIMIZING A SEAM FOR A PRINT JOB (75) Inventors: Yoav Telem, Kfar-Schmaryahu (IL); Shay Dardikman, Tel Aviv (IL)

(73) Assignee: Eastman Kodak Company, Rochester, NY (US)

( * ) Notice: Subject to any disclaimer, the term of this patent is extended or adjusted under 35 U.S.C. 154(b) by 457 days.

(21) Appl. No.: 12/764,160

(22) Filed: Apr. 21, 2010

(65) Prior Publication Data
US 2011/0261414 A1    Oct. 27, 2011

(51) Int. Cl.
*H04N 1/40* (2006.01)
(52) U.S. Cl.
USPC ........................................ 358/3.29

(58) Field of Classification Search
None
See application file for complete search history.

(56) References Cited

FOREIGN PATENT DOCUMENTS
EP    1 292 120 A2    3/2003
EP    1 543 966 A1    6/2005

*Primary Examiner* — Jeremiah Bryar
(74) *Attorney, Agent, or Firm* — Nelson Adrian Biish (57) ABSTRACT A method for seam for a layout of a packaging printing job (908). The method is adapted to create minimal plate waste (1312) and includes the following steps; providing a wrapped layout (120) comprised of plurality of step and repeat element elements, and analyzing the wrapped layout to produce seam cut line design (1204) for the packaging printing job. The cut line is produced by searching for an non imaged areas inside the images and the borders of the step and repeat elements.

4 Claims, 13 Drawing Sheets

FIG. 4
(PRIOR ART)
LANES WITH A STAGGER

OPTIMIZING A SEAM FOR A PRINT JOB

CROSS REFERENCE TO RELATED APPLICATIONS

Reference is made to commonly-assigned U.S. patent application Ser. No. 12/025,807 (now U.S. Publication No. 2009/0195837), filed Feb. 5, 2008, entitled A METHOD FOR IMAGING FLEXOGRAPHIC PLATES, by Dardikam et al., the disclosure of which is incorporated herein.

FIELD OF THE INVENTION

The present invention relates to flexography printing and more specifically to methods and apparatus for designing a sleeve for optimal flexographic plate imaging.

BACKGROUND OF THE INVENTION

Flexographic printing plates are relatively expensive compared to other types of plates such as those used in offset printing; therefore, flexographic printers will only use the appropriate amount of plate material necessary to transfer a graphic image. The graphic image is subsequently transferred from the flexographic plate to a substrate such as film, paper, or board, etc. Printers reduce the cost of printing when using flexographic plate material, by not using flexographic material where no graphic elements exist.

Imaging on plates mounted on sleeves requires two major functions:
- a) Image wrapping—preparation of an input file, typically presented by a tagged image file format (TIFF). The input file represent a minimal repeat length of repeated graphics imaged on the flexographic plate.
- b) Seam definition—preparing the plate/media that will be mounted on the sleeve.

Figure 1:
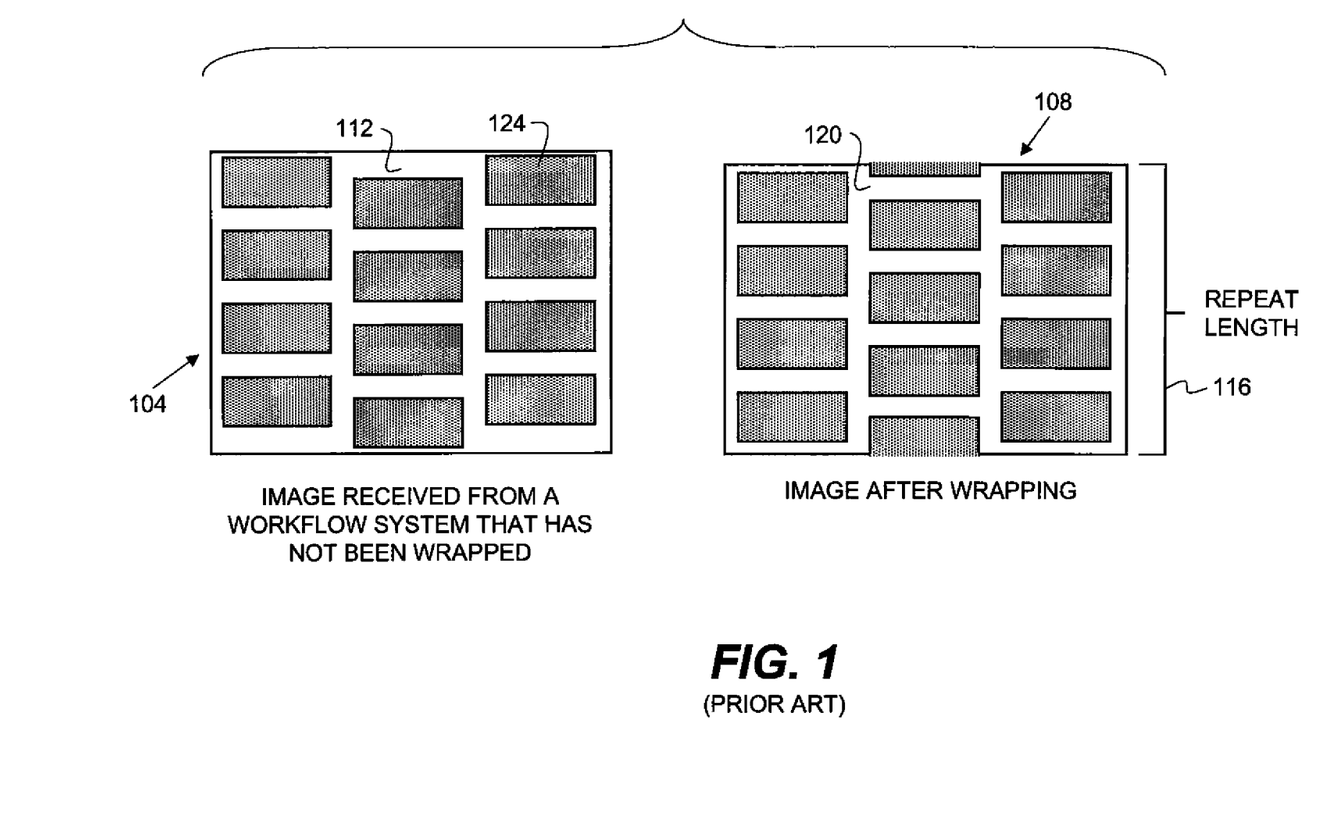
FIG. 1 is a schematic illustrating an image layout produced by a workflow system and a layout prepared for a one-up artwork for imaging (prior art)

During the image wrapping a staggered layout 104 comprising a step and repeat element or image element 124 is positioned in various locations across staggered layout 104. The staggered layout 104 is converted into an imageable rectangle 108 as is shown in FIG. 1. The converted imageable rectangle 108 is prepared for further imaging on a computer to plate imaging device.

The imaged data comes in a 1-bit TIFF format 112 from a workflow system. It is cropped and sections are rearranged producing "one-up" artwork 120 after wrapping, to output a rectangular image area that has a height equal to the repeat length 116 (circumference) of the media sleeve.

Figure 2:
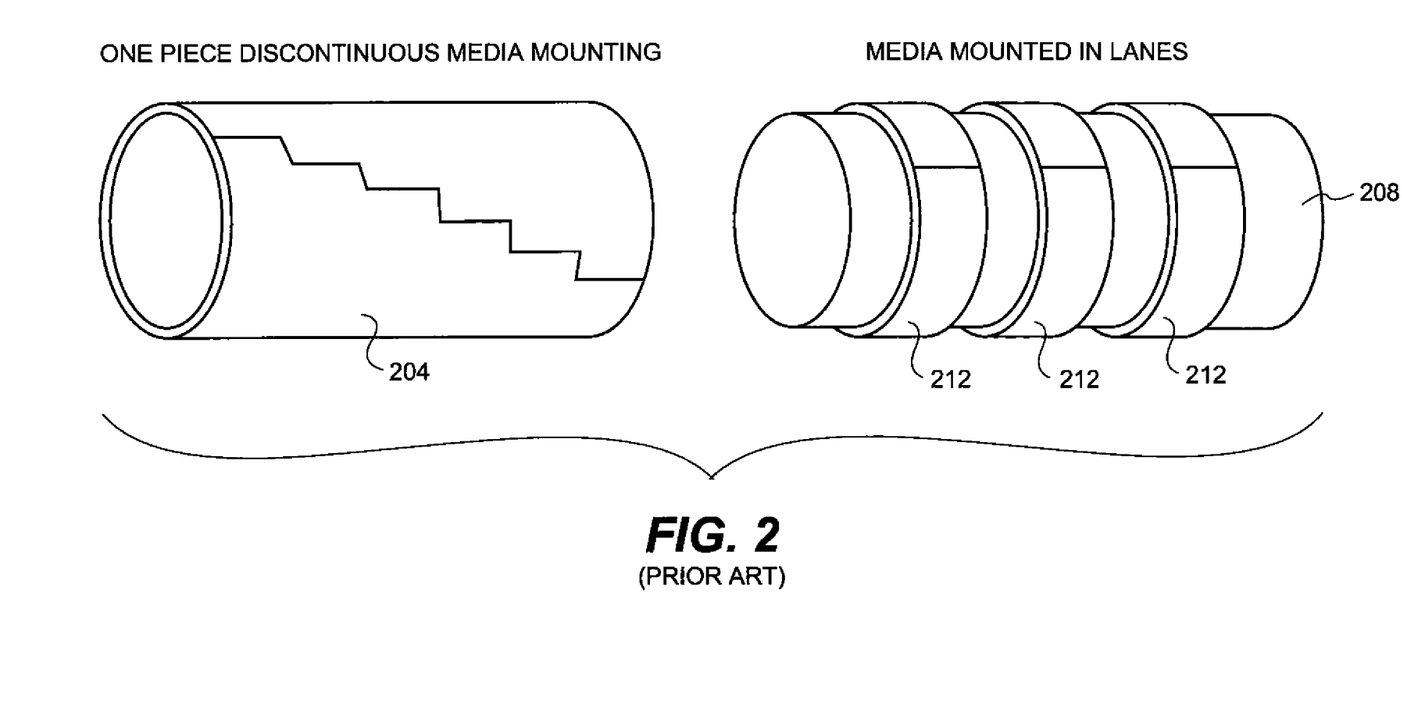
FIG. 2 is a schematic illustrating one piece discontinuous media mounted around a sleeve and plurality of lanes mounted around a sleeve (prior art)

A sleeve can be supplied either as a continuous sleeve, without a seam, in this case imaging on a single and continuous media which has already been mounted on a sleeve. Alternatively, the sleeve can be supplied with a seam, or discontinuous, such that one or more pieces of flat media are mounted on a sleeve prior to imaging. The media can be mounted as a single piece 204, as shown in FIG. 2, wrapped around the sleeve 208. The media can also be mounted in lanes 212 (strips of media) wrapped around sleeve 208.

A sleeve design software application is useful to design a seam position for a discontinuous sleeve. The seam position defines the shape of the media, which will be cut on a cutting table. The application will also allow a "wrapped view" and a "stitch view" to display the image in various ways to determine the best seam position.

The software application will create:
- a) a TIFF File that contains the wrapped data.
- b) a cutting table file in an appropriate format such as Common File Format Version 2 (CFF2) for cutting the plate media to conform with the packaging job requirements.
- c) mounting instructions that the operator uses to program the pre-mounter and position the media for the stagger. This is a text file containing the sleeve and one-up artwork dimensions, stagger distance, and other job parameters.

Packaging jobs may differ in seam paths, depending upon the dimensions of the one-up artwork and the stagger in the step-and-repeat pattern. Separations within a job may have different seam paths, depending on the image content of the separation. Seam path can be a straight line or, as shown FIG. 3, a staggered path such as a "castle-top" 304 or "staircase" 308 patterns.

Figure 3:
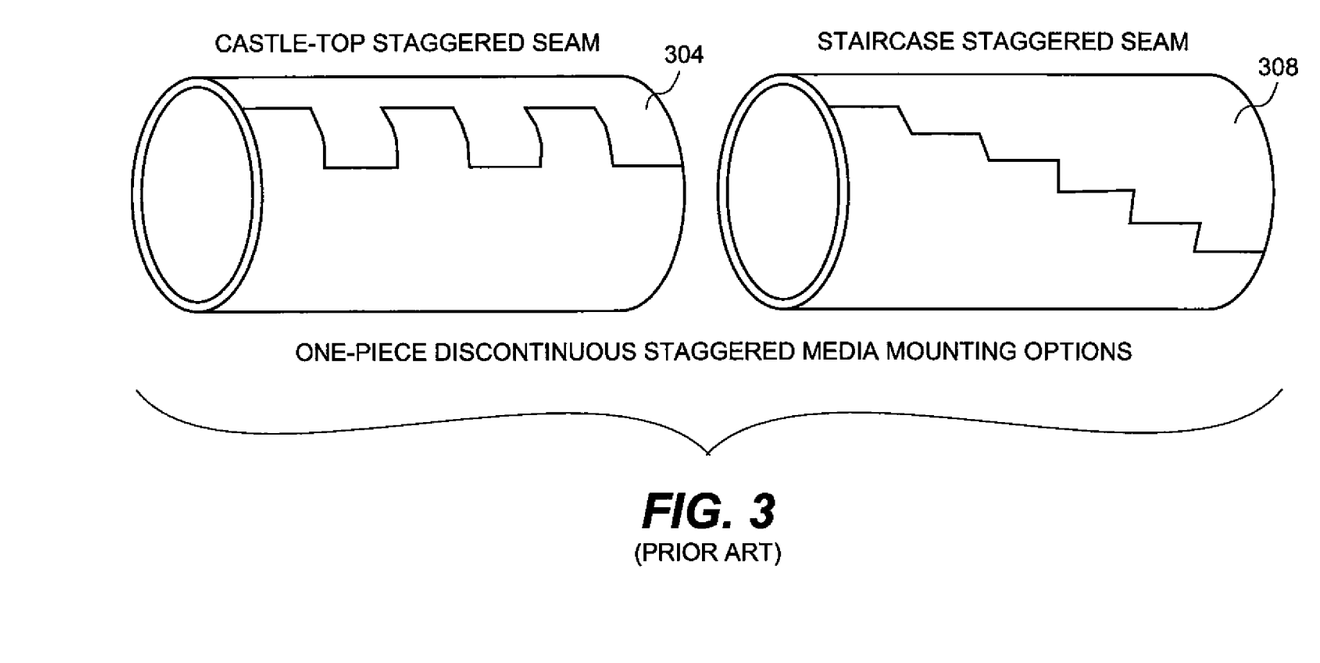
FIG. 3 is a schematic illustrating one piece discontinuous media mounting options castle top and staggered (prior art)

When mounting media to accommodate staggered step and repeat, the seams need to be positioned so that they do not run through an area that will be imaged. One way to do this is to have the seams run along the staggers of the stepped and repeated image, as there is usually no content in the staggered area that would be affected by a seam running through it. FIG. 3 shows a one-piece discontinuous media.

Figure 4:
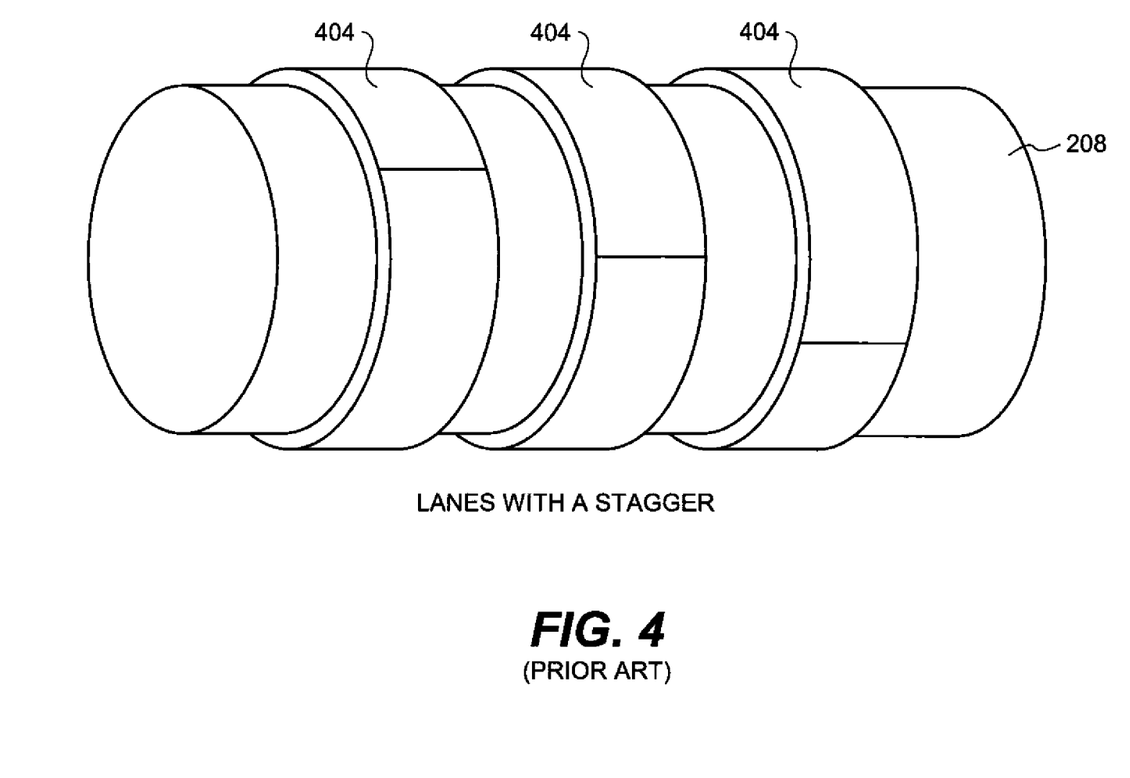
FIG. 4 is a schematic illustrating of lanes around a sleeve configured in a staggered manner (prior art)
Figure 5:
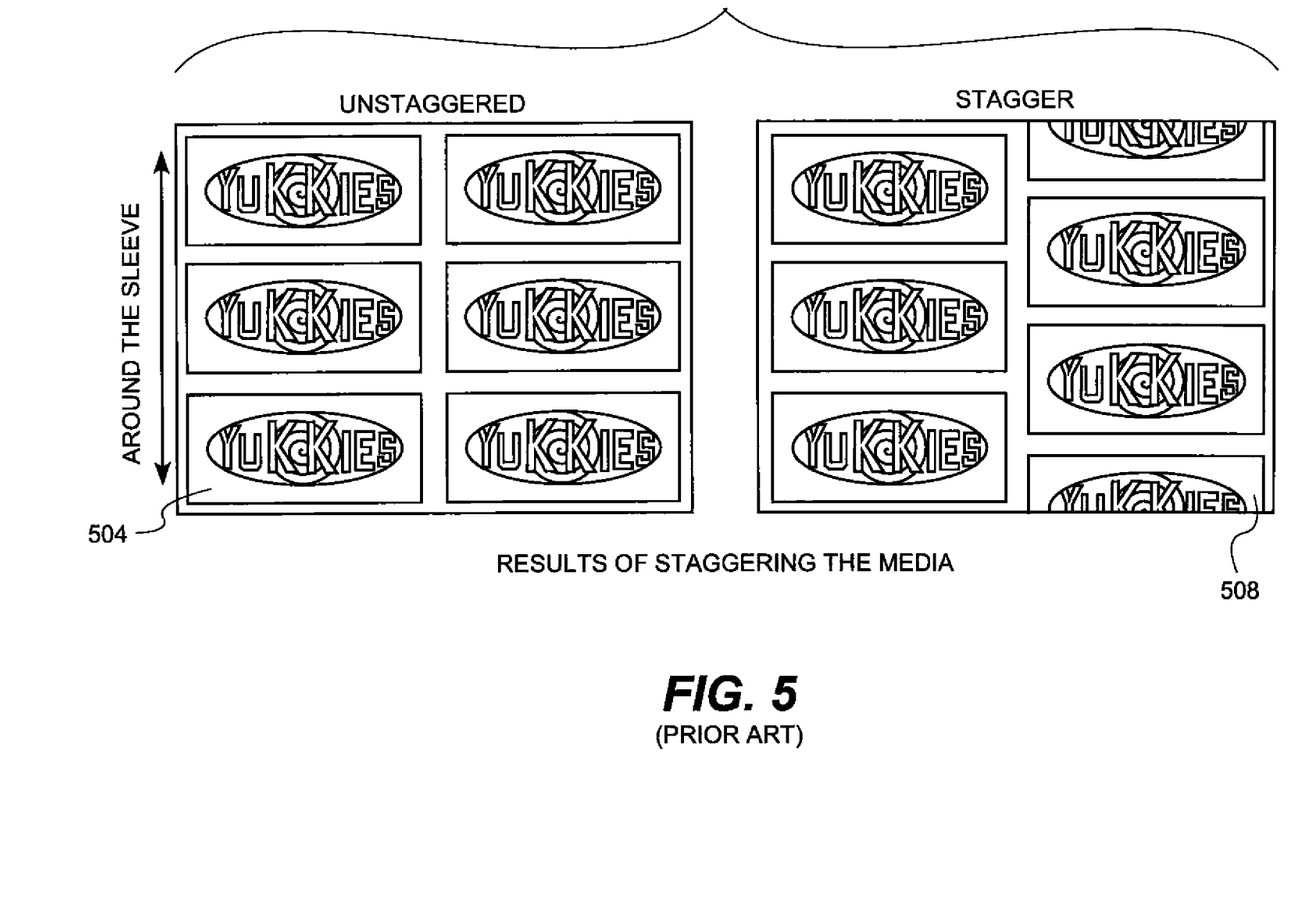
FIG. 5 is a schematic illustrating of an artwork configured in a non staggered and in a staggered manner (prior art)

FIG. 4 shows lanes positioned in a staggered manner 404 around sleeve 208. FIG. 5 illustrates a non-staggered artwork 504 configuration and a staggered 508 art work configuration.

The separations within one job do not all have to be mounted in the same manner. In a six-separation job, for example, it may make sense to use continuous media for two separations, single piece media for three separations, and lanes for one separation.

Decisions about media mounting do not need to be made during file preparation. The operator can make decisions on a separation by separation basis just prior to mounting, based on various factors. See below.

| Mounting options | Advantages | Disadvantages |
| --- | --- | --- |
| Lanes | Rectangular pieces of media only<br>Potentially less media used<br>Stickyback seams can be aligned with plate seams | More pieces of media to mount (increased time and risk of errors)<br>More difficult to minimize gaps across the drum<br>Many seams to treat (sealing, taping) |
| One piece straight seam | Rectangular pieces of media only<br>Only one piece of media to mount<br>Fewer seams to treat (sealing, taping)<br>Stickyback seams can be aligned with plate seams | Difficult to find a location for a straight seam in busy separations<br>Chance of press bounce if bearer bars are not used |
| One piece staggered seam | Only one piece of media to mount<br>More continuity in the slow scan | Non-rectangular piece of media increases likelihood of wasting media |

| Mounting options | Advantages | Disadvantages |
|---|---|---|
| (castle-top or staircase) | direction (than lanes) Fewer seams to treat (sealing, taping) | |

Figure 6:
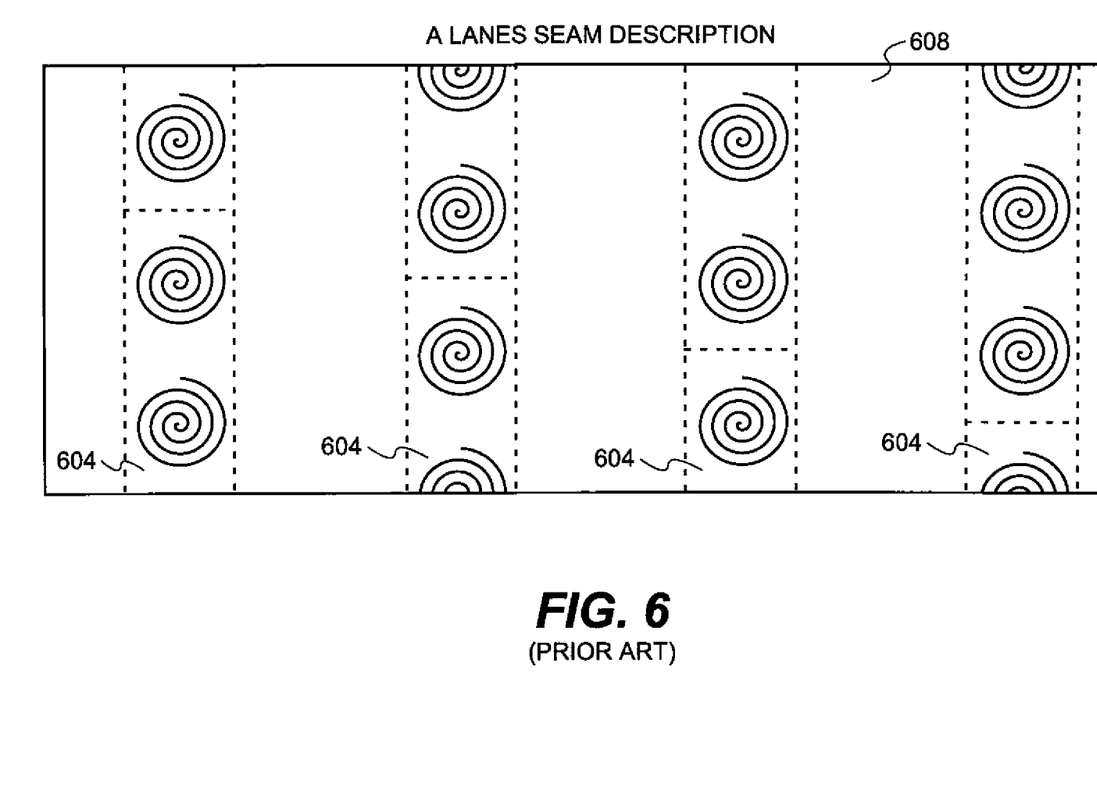
FIG. 6 is a schematic illustrating lanes seam configuration (prior art)

FIG. 6 shows an example of a seam defined by lanes 604. The example shows large non-imaged areas 608, hence calling for lanes configuration. Just the areas defined by lanes 604 will be imaged, therefore a lanes configuration will be optimal for this packaging job, and will yield saving of expensive plate material.

Figure 7:
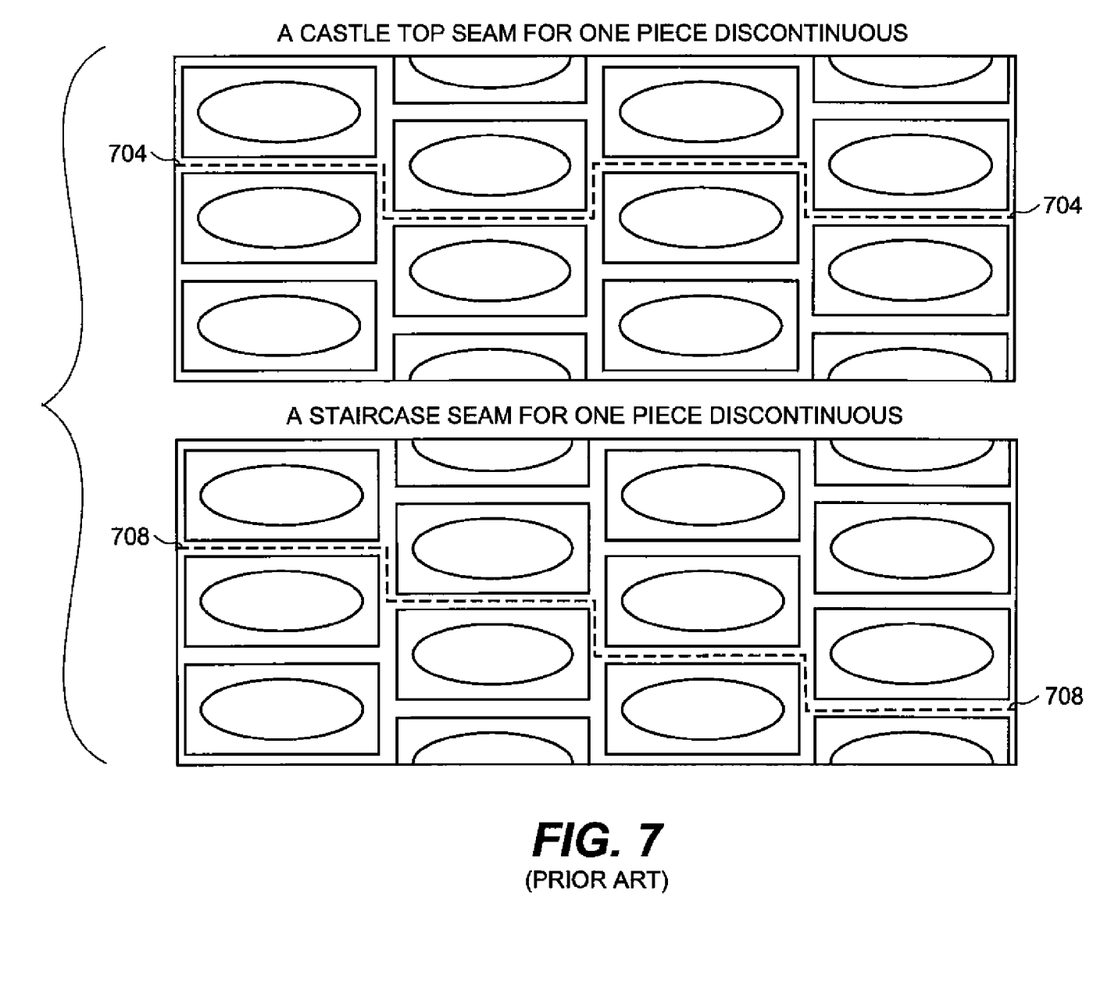
FIG. 7 is a schematic illustrating a piece configuration with castle top seam and with a staircase seam (prior art)

In the case where a single piece of media is the optimal solution, such a configuration is adequate for packaging jobs characterized by imaging content throughout the entire plate. In those configurations it will be still there will be only one seam to describe, but a decision will be required whether the seam will be in a form of castle top 704 or staircase 708 as is depicted in FIG. 7.

A suitable software application may allow the user a full control over the cutting line. The user can move the line while having a full view of the data of the file. Additionally the user may be able to define the path of the line according to visual view on screen.

SUMMARY OF THE INVENTION

Briefly, according to one aspect of the present invention a method for seam design for a full layout of a packaging printing job the method is adapted to create minimal plate waste includes the following steps, providing a wrapped layout comprised of plurality of step and repeat element elements, and analyzing the wrapped layout to produce seam cut line design for the packaging printing job wherein the cut line is produced by searching for an non-imaged areas inside the images and the borders of the step and repeat elements.

The invention and its objects and advantages will become more apparent in the detailed description of the preferred embodiment presented below.

DETAILED DESCRIPTION OF THE INVENTION

The present invention describes methods of selecting scenarios for reducing flexographic plate waste. This invention helps reduce material waste in the process of flexographic plate production.

The present invention is adapted to improve deficiencies in the current workflow process. More specifically it suggests an automatic method to create an optimal cut line for the flexographic plate. In one embodiment of the invention the optimal cut line is created automatically, taking into consideration the data content of the various job separations. The cut line design may take into consideration the step and repeat element structure, thus saving cut line calculation processes. Creation of similar cut lines across different separations is preferable. One of the parameters which are considered during a cut line creation is to design similar cut lines across different separations of a printing job. The parameter is also taken into consideration as well during cut line creation.

Figure 8:
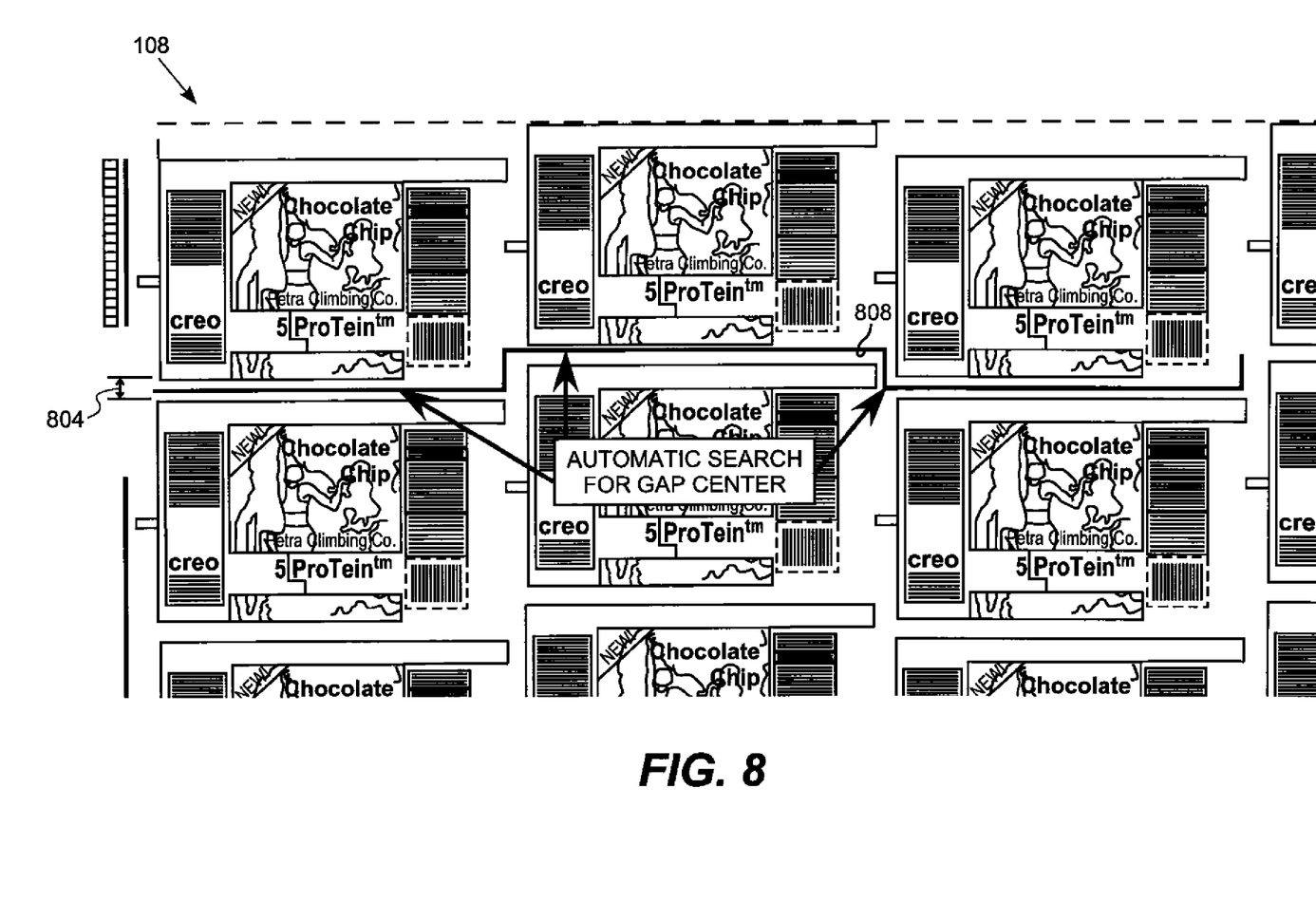
FIG. 8 is a schematic illustrating a creation of a cut line automatically, given an imageable rectangle and a desired gap between elements for optimal seam creation.

Layout information such as step and repeat location and gap 804, the position of images in the full layout is received from the workflow system to allow analysis and planning of the cut line design. The cut line 808 (shown in FIG. 8) is constructed using the information received from the workflow in conjunction with analysis of the file data. A predefined minimum distance parameter is used to calculate the cut line. FIG. 8 shows an imageable rectangle 108 populated with graphical elements to be imaged. A cut line 808 is calculated to be further provided for the cut machine. The cut line is calculated considering the minimum defined distance between the cut line and the imageable file data.

Figure 9:
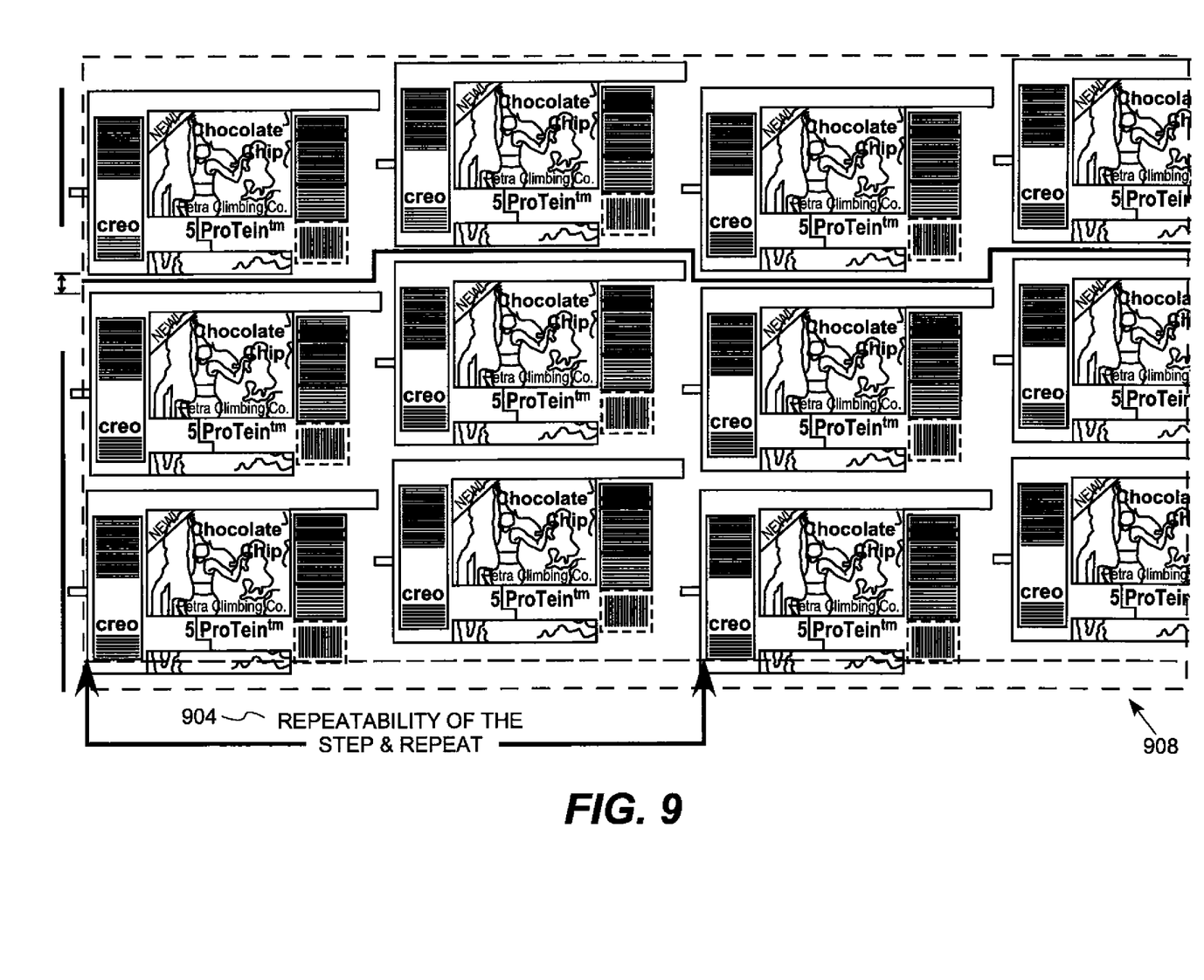
FIG. 9 is a schematic illustrating a repeatable single step and repeat element in an entire imageable rectangle.

In another embodiment of the invention the above parameters are used to apply the cut design created for two step and repeat element 904 and depicted in FIG. 9 to the entire flexographic plate layout 908. This reduces the amount of work when defining the cut line manually and lower the chance for errors.

Figure 10:
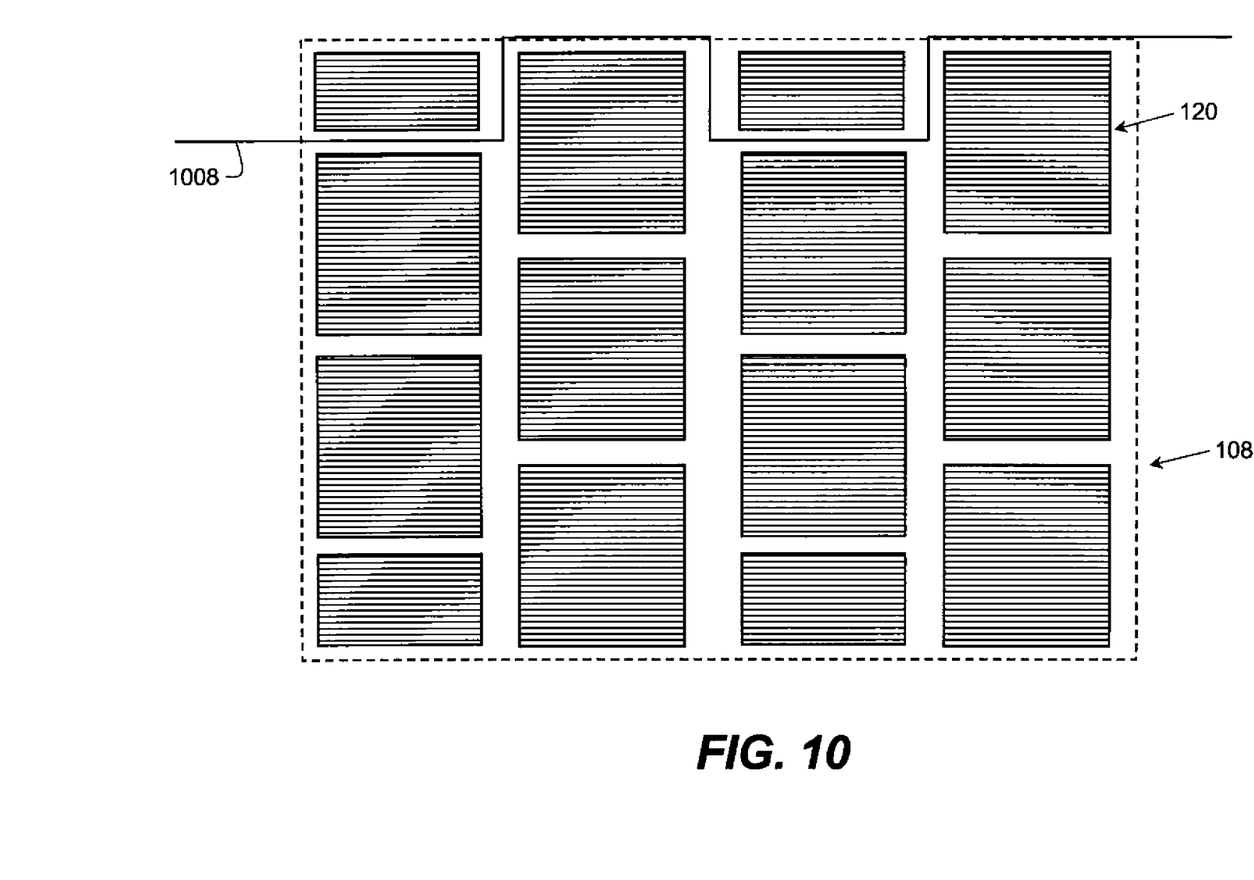
FIG. 10 is a schematic illustrating a wrapped area with a cut line created along the boarders in a step and repeat element.
Figure 11:
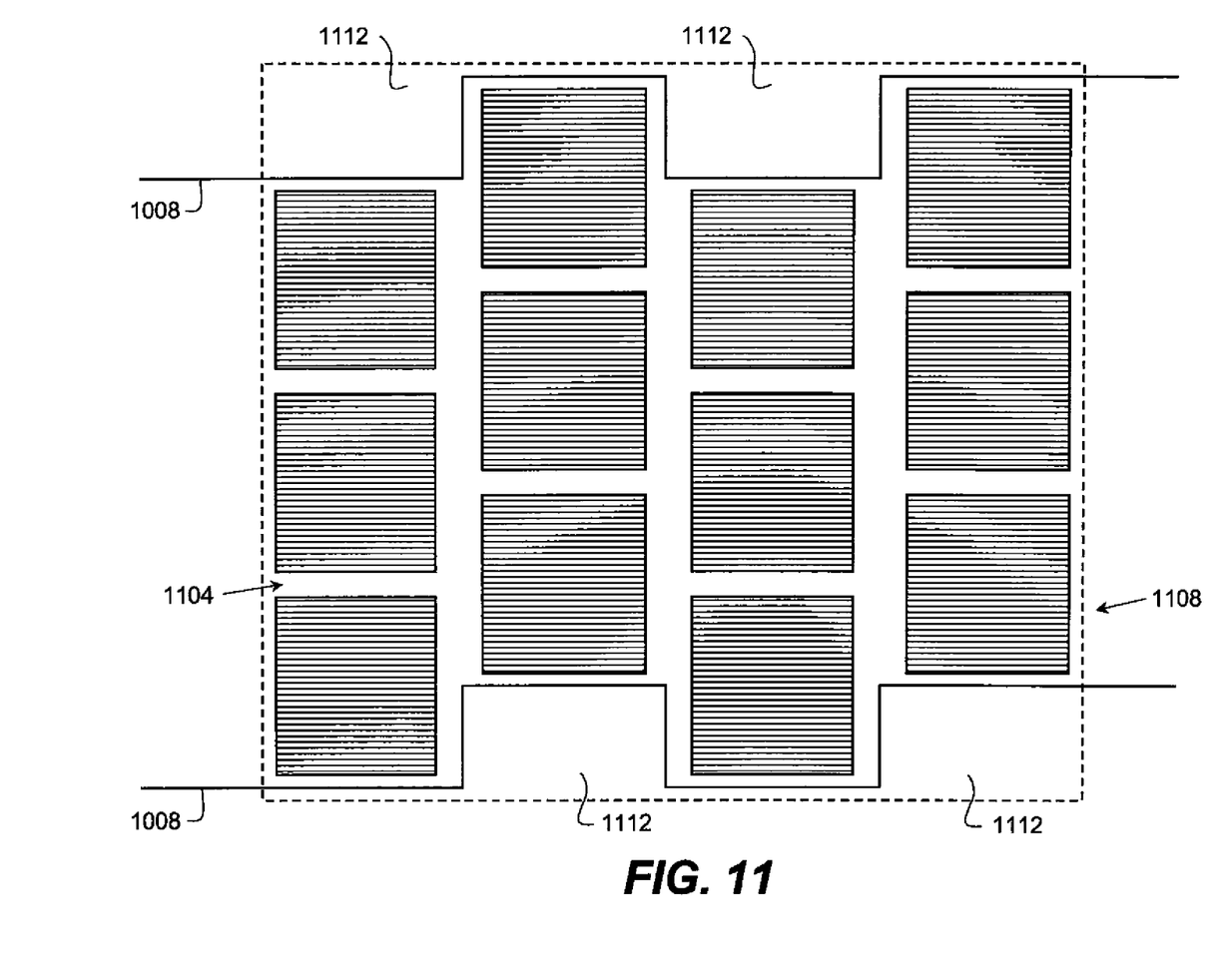
FIG. 11 is a schematic illustrating a flexographic plate geometry with plate waste generated by cut line created along the boarders of step and repeat elements.

FIG. 10 shows an imageable rectangle 108 encompassing a one up-artwork 120, configured in a digital format ready for exposure or output on an imaging device. Cut line 1008 illustrates the geometry of the plate structure 908. FIG. 11 shows a flexographic plate layout 908 wherein a cut line 1008 was created by searching along the borders of a step and repeat elements 124. A cut line 1008 yields an enclosing rectangle 1108 for flexographic plate layout 908, thus producing relatively large wasted plate areas 1112 on plate 908.

Figure 12:
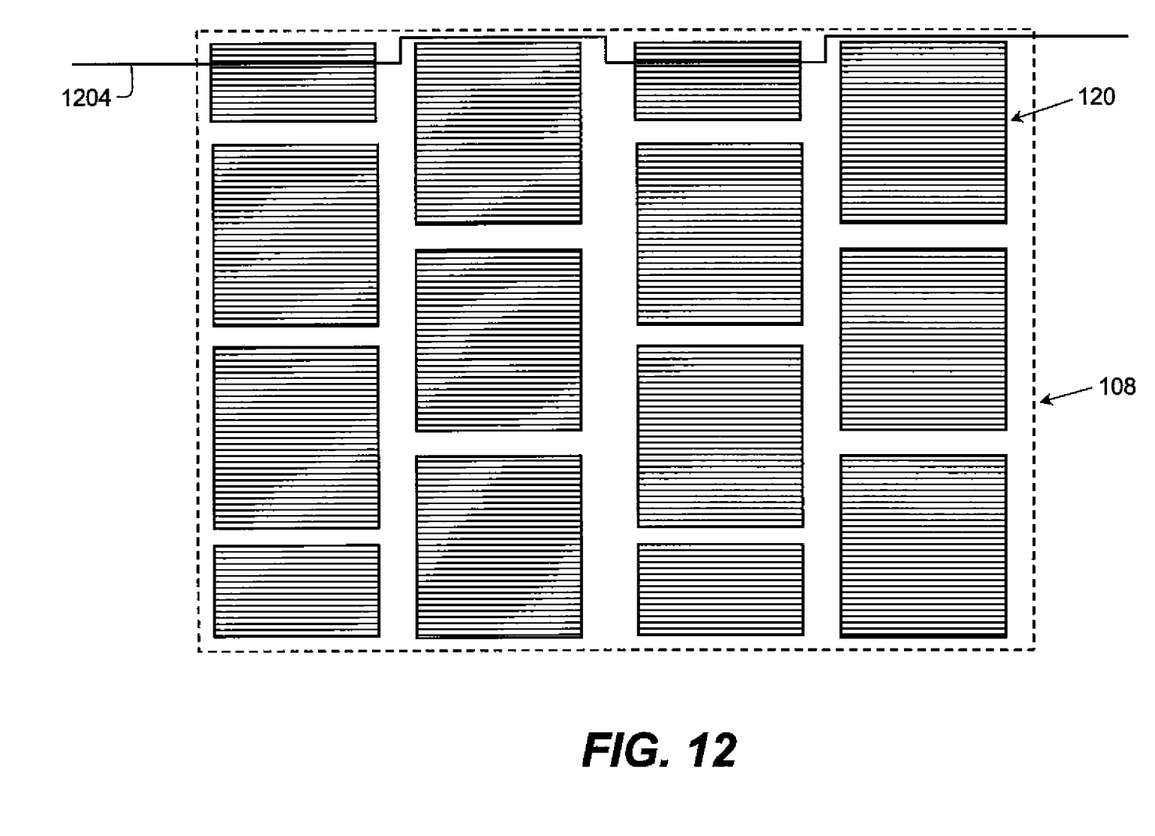
FIG. 12 is a schematic illustrating a wrapped area with a cut line created by searching for non-imaged areas inside the step and repeat elements.

FIG. 12 shows a similar configuration depicted by FIG. 11, the difference is in that the cut line 1204 in this case is created by searching for non-imaged areas inside each step and repeat element 124, inside the image itself, across the entire image able rectangle 108. The cut line 1204 is constructed to minimize the flexographic plate waste.

Figure 13:
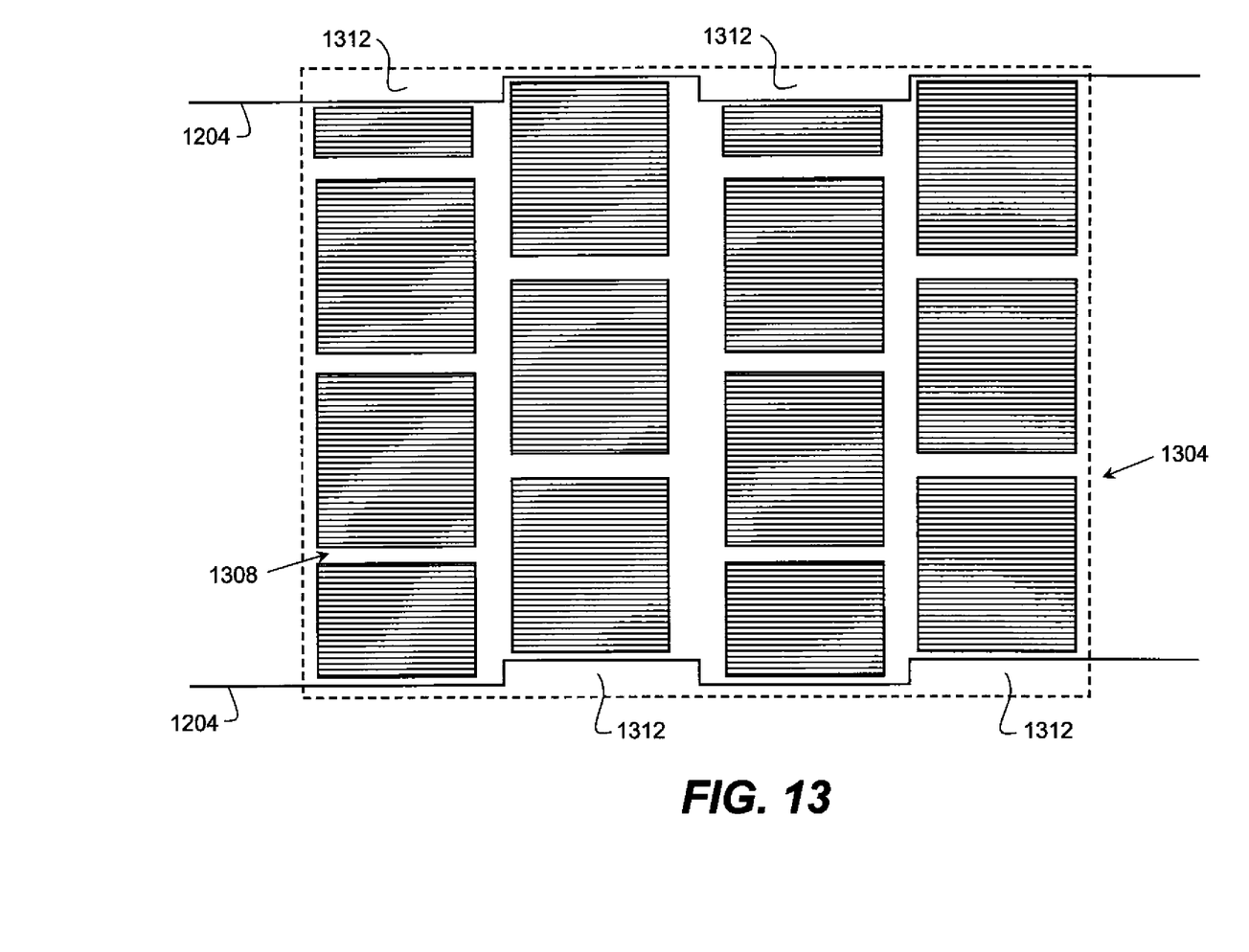
FIG. 13 is a schematic illustrating flexographic plate geometry with plate waste generated by a cut line created by searching for non-imaged areas inside the step and repeat elements.

FIG. 13 shows plate waste areas 1312 generated by creating a cut line that searches for non-imaged areas inside step and repeat elements 124. The waste areas 1312 are significantly smaller than the waste areas 1112 generated by cut line 1008. Similarly the enclosing rectangle 1304 around step and repeat elements on plate 1308 of the step and created by cut line 1204 is smaller than the enclosing rectangle 1104 created by cut line 1008.

An important factor in looking for an optimal cut line 1204 is to search for non-imaged data areas inside the step and repeat element 904 and not just at its boarder. The cut line 1204 should be created at a minimal accumulated cut line length wherein each straight segment in the cut line should maintain a minimal length as well.

Once the cut line has been established, cutting information is used to cut an imaging plate. The cut plate is mounted on a cylinder of an imaging device and the wrapped layout is imaged on the imaging plate.

Similarities between separations will be automatically detected and the user will be informed to allow a better and optimized cut file planning. This will be performed automatically by examining the data in each separation and splitting to common groups. The invention has been described in detail with particular reference to certain preferred embodiments thereof, but it will be understood that variations and modifications can be effected within the scope of the invention.

PARTS LIST

| | |
|---|---|
| 104 | staggered layout |
| 108 | imageable rectangle |
| 112 | input from workflow station |
| 116 | repeat length |
| 120 | one-up artwork |
| 124 | step and repeat element |
| 204 | a single piece wrapped around a sleeve |
| 208 | sleeve |
| 212 | lanes |
| 304 | castle top |
| 308 | staircase |
| 404 | lanes around a sleeve in a staggered configuration |
| 504 | non-staggered art work configuration |

-continued

PARTS LIST

| | |
|---|---|
| 508 | staggered art work configuration |
| 604 | lanes |
| 608 | non-imaged areas to be saved |
| 704 | castle top seam |
| 708 | staircase seam |
| 804 | desired gap |
| 808 | cut line (with a gap center created by an automatic search) |
| 904 | single step and repeat element |
| 908 | full flexographic plate layout |
| 1104 | enclosing rectangle |
| 1008 | cut line created along borders lines around the step and repeat elements |
| 1108 | enclosing rectangle |
| 1112 | plate waste areas |
| 1204 | cut line created by searching for non imaged areas inside a step and repeat element |
| 1304 | enclosing rectangle |
| 1308 | step and repeat elements on plate |
| 1312 | waste areas |

The invention claimed is:

1. A method for optimizing a seam for a layout of a packaging printing job to minimize plate waste comprising:
   providing a wrapped layout comprised of a plurality of image elements;
   setting a minimal acceptable distance between a seam cut line and imageable areas in said wrapped layout;
   searching inside digital content of said image elements to locate areas which will not be imaged;
   analyzing said wrapped layout to produce the seam cut line for said packaging printing job wherein said cut line may be created inside said image elements in said areas which will not be imaged and wherein said seam cut line meets the minimal acceptable distance between the seam cut line and said imageable areas in said wrapped layout and minimizes a length of said seam line;
   cutting an imaging plate according along said seam cut line;
   mounting said imaging plate on a cylinder of an imaging device; and
   imaging said wrapped layout on said imaging plate.

2. The method according to claim 1 wherein said cut line comprises a plurality of connected straight line segments.

3. The method according to claim 1 wherein said cut line is a castle top cut.

4. The method according to claim 1 wherein said cut line is a staggered cut.

* * * * *